United States Patent
Johnson et al.

(10) Patent No.: US 8,517,253 B2
(45) Date of Patent: Aug. 27, 2013

(54) SYSTEMS AND METHODS FOR USING MACHINE-READABLE VISUAL MARKERS TO PROVIDE ENVIRONMENTAL CONTEXT FOR COMMUNICATIONS

(75) Inventors: Jeremy Matthew Johnson, Decatur, GA (US); Melody Moore Jackson, Atlanta, GA (US); Carrie Bruce, Jonesboro, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 28 days.

(21) Appl. No.: 13/273,770

(22) Filed: Oct. 14, 2011

(65) Prior Publication Data

US 2012/0267429 A1 Oct. 25, 2012

Related U.S. Application Data

(60) Provisional application No. 61/393,048, filed on Oct. 14, 2010.

(51) Int. Cl.
*G06F 17/00* (2006.01)
(52) U.S. Cl.
USPC .......................................... 235/375; 235/487
(58) Field of Classification Search
USPC ............................ 235/375, 487, 462.09, 462.1
See application file for complete search history.

(56) References Cited

U.S. PATENT DOCUMENTS

| | | | | |
|---|---|---|---|---|
| 7,233,903 B2* | 6/2007 | Raman et al. | ................. | 704/275 |
| 2004/0076312 A1* | 4/2004 | Sweeney | ....................... | 382/114 |
| 2005/0256782 A1* | 11/2005 | Sands et al. | .................... | 705/26 |
| 2008/0128504 A1* | 6/2008 | Wang et al. | ................ | 235/462.1 |
| 2010/0092095 A1* | 4/2010 | King et al. | ..................... | 382/229 |

FOREIGN PATENT DOCUMENTS

GB 2283850 A * 5/1995

* cited by examiner

*Primary Examiner* — Edwyn Labaze
(74) *Attorney, Agent, or Firm* — Jay R. Anderson, Esq.; Ryan A. Schneider, Esq.; Troutman Sanders LLP

(57) ABSTRACT

Disclosed herein are communication systems, methods, and devices for providing communications based on visual markers. An exemplary communication system can include an image receipt unit, an image processing unit, a context processing unit, and an audio output device. The image receipt unit can receive an image of a surrounding area. The image processing unit can extract visual markers from the image. The context processing unit can identify an environmental context based on the visual markers. The communication system can then map the environmental context to a set of potential communication outputs. The communication system can receive a selection of a potential communication output from the user, and the audio output device can audibly output the selected communication output.

20 Claims, 4 Drawing Sheets

SYSTEMS AND METHODS FOR USING MACHINE-READABLE VISUAL MARKERS TO PROVIDE ENVIRONMENTAL CONTEXT FOR COMMUNICATIONS

CROSS-REFERENCE TO RELATED APPLICATIONS

This application claims priority to and the benefit under 35 U.S.C. §119(e) of U.S. Provisional Patent Application No. 61/393,048, filed 14 Oct. 2010, the contents and substance of which are incorporated herein by reference in its entirety as if fully set forth below.

TECHNICAL FIELD

Various embodiments of the present invention relate to assistive communication systems and, more particularly, to systems, methods, and devices configured to facilitate communication or cognitive aid by providing communications based on environmental context.

BACKGROUND

Assistive devices for communication exist to help people who have impairments in expressive (i.e., conveying information to another person or to the environment) or receptive (i.e., receiving and understanding information from another person or from the environment) communication. For example, an assistive device can help someone who has a vision impairment interact with the environment, present cues to a person with a cognitive impairment, or provide speech output for a person who has a speech or language impairment. However, conventional assistive devices fail to provide an efficient means of translating environmental factors into relevant communication options.

SUMMARY

There is a need for a communication system to provide communications based on machine-readable visual markers. It is to such a communication system, along with an assistive device and a communication method, that various embodiments of the invention are directed.

Briefly described, an exemplary communication system comprises an image receipt unit, an image processing unit, and a context processing unit, each of which can be aspects of a computing device.

The image receipt unit can receive an image of environmental surroundings of the communication system. In an exemplary embodiment, the image receipt unit can be an image capture device, such as a still or video camera.

The image processing unit can analyze the image to identify one or more visual markers in the image. Each visual marker can be, for example, and barcode or a fiducial, and each visual marker can represent a target, such as a person, object, or location. Before the image is captured, the visual markers are placed in the environment, positioned to identify their corresponding targets. The set of visual markers identified in the image can define an environmental context.

The context processing unit can identify the environmental context from the visual markers and map the environmental context to one or more communication options that are based on the environmental context, which itself is based on the visual markers. The context processing unit can have access to a database that maps each environmental context to relevant communication options. For example, and not limitation, the communication options can refer to targets identified by the visual markers of the environmental context.

A user of the communication system can select from among the communication options, and an output device can audibly output the selected option. For example, and speaker or other audio output device can output the selected option audibly. Accordingly, the communication system can be used to provide audio that is based on its current environment, so as to perform as a cognitive aid or an interpersonal communication aid.

These and other objects, features, and advantages of the communication system will become more apparent upon reading the following specification in conjunction with the accompanying drawing figures.

DETAILED DESCRIPTION

Figure 1:
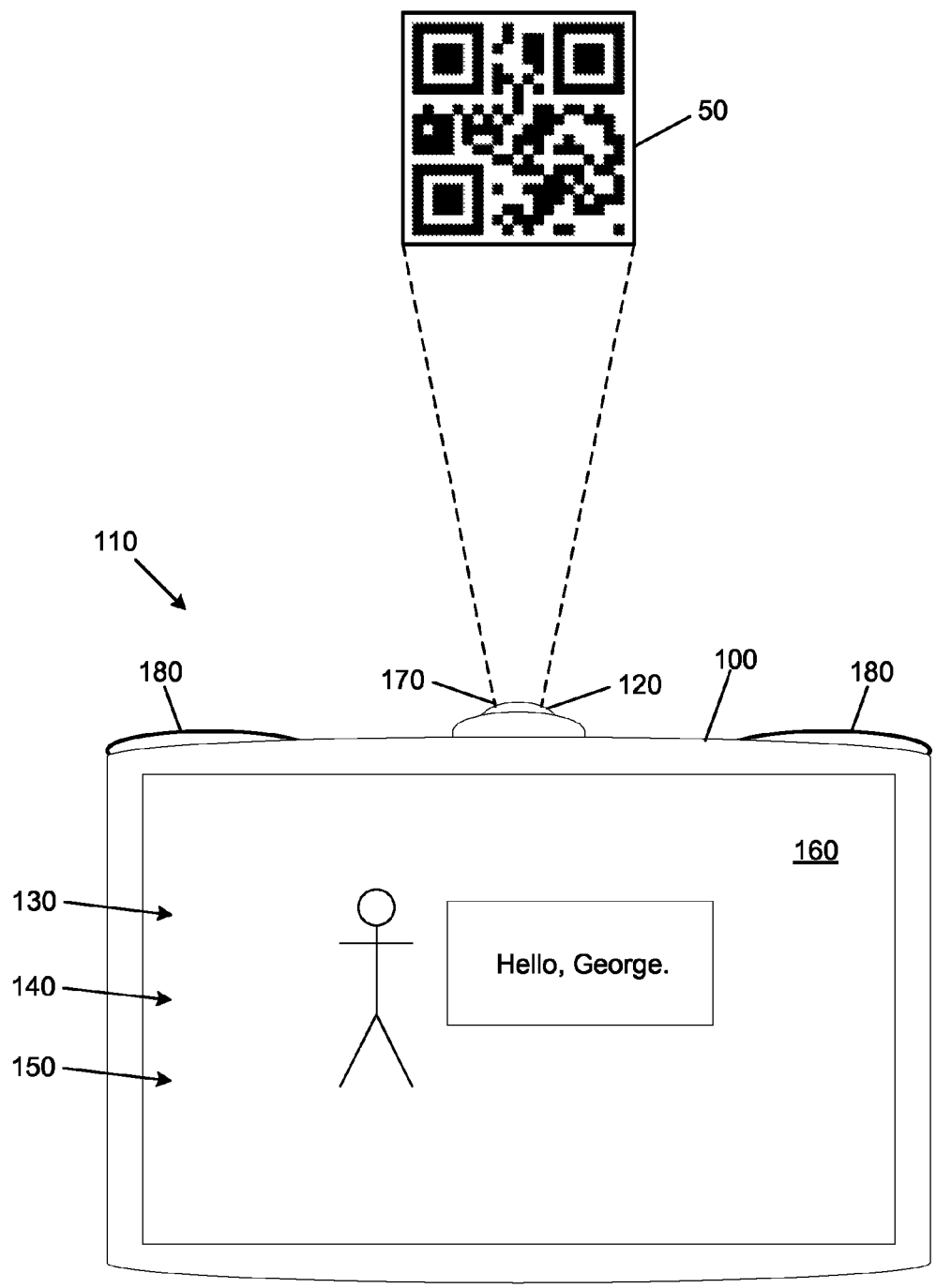
FIG. 1 illustrates a diagram of operation of a communication system, according to an exemplary embodiment of the present invention.

To facilitate an understanding of the principles and features of the invention, various illustrative embodiments are explained below. In particular, the invention is described in the context of being an augmentative and alternative system to facilitate communications, including audio communications, between a user and the environment, potentially including other parties in the environment. Embodiments of the invention, however, need not be limited to this context. Rather, embodiments of the invention can utilize various media of communication to provide information to a user or to facilitate interpersonal communications between the user and a second party.

The components described hereinafter as making up various elements of the invention are intended to be illustrative and not restrictive. Many suitable components that can perform the same or similar functions as components described herein are intended to be embraced within the scope of the invention. Such other components not described herein can include, but are not limited to, similar or analogous components developed after development of the invention.

Various embodiments of the present invention are communication systems, methods, and devices to provide communication output based on visual markers in the environment. Referring now to the figures, in which like reference numerals represent like parts throughout the views, various embodiment of the communication system will be described in detail.

FIG. 1 illustrates a diagram of the communication system 100, according to an exemplary embodiment of the present invention. As shown, the communication system 100 can comprise an assistive device 110 with, or in communication with, a display screen 160, an image capture device 170, and an audio output device 180. The communication system 100 can further include, such as integrated into the assistive device 110, an image receipt unit 120, an image processing unit 130, a context processing unit 140, and an application layer 150.

In some exemplary embodiments, these various units of the communication system 100 need not be integrated into a single device. One or more of the units can reside at remote locations. For example, and not limitation, all or a portion of the context processing unit 140 can be located at a remote server in communication with the assistive device 110.

Figure 4:
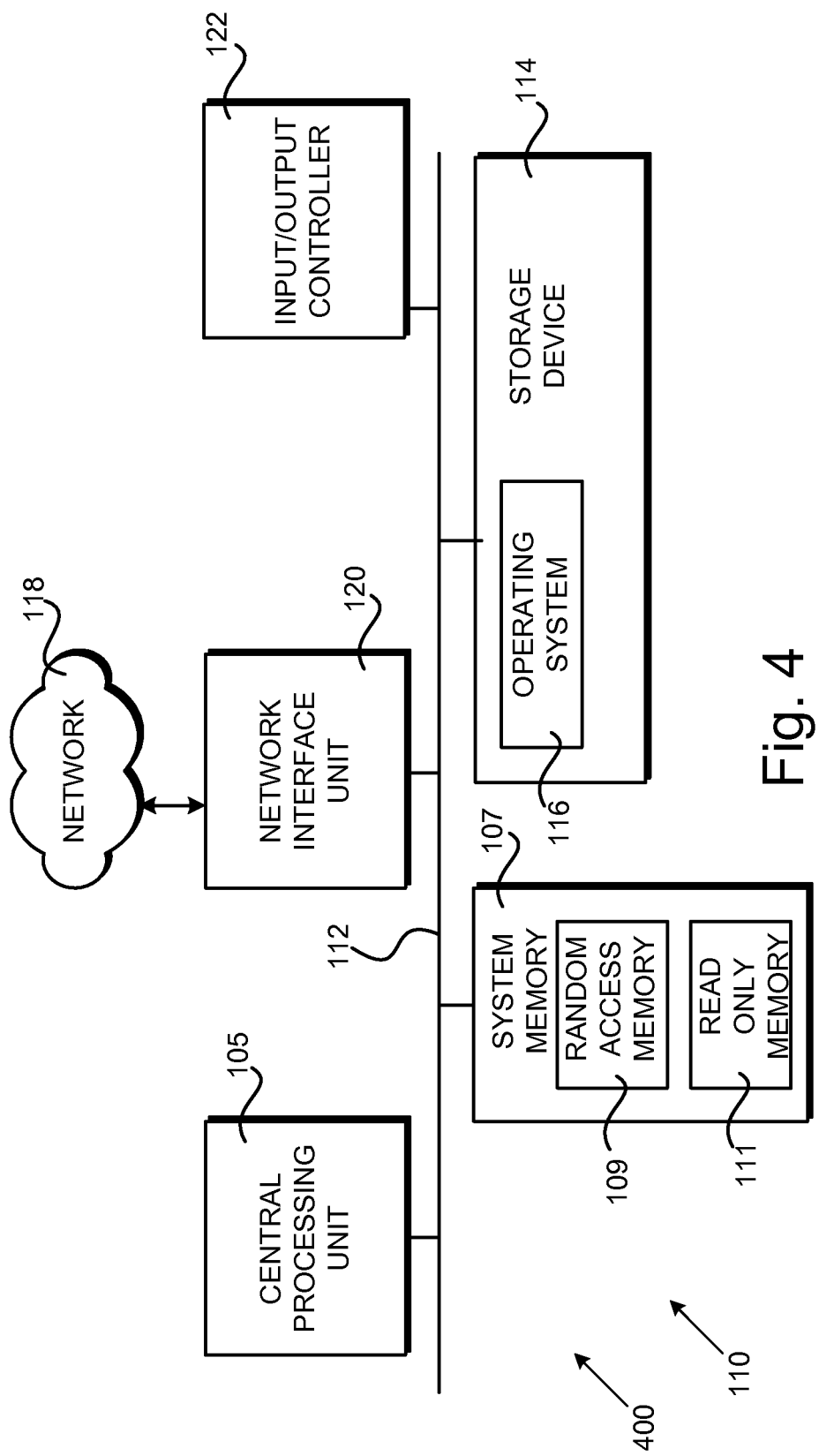
FIG. 4 illustrates an architecture of an exemplary computing device in which all or a portion of the communication system can be embodied, according to an exemplary embodiment of the present invention.

All or a portion of the communication system 100 can be embodied in a computer program product on a computer-readable medium, executable by a computer processor of a computing device 400 (see FIG. 4). In an exemplary embodiment, the communication system 100 can comprise a specialized computing device, such as that shown as the assistive device 110 in FIG. 1. Alternatively, the communication system 100 can be integrated, in whole or in part, into a traditional computing device that becomes specialized by inclusion of the communication system 100. For example, and not limitation, the communication system 100 can be integrated into a mobile telephone or other mobile device.

Each of the image receipt unit 120, the image processing unit 130, and the context processing unit 140 can be aspects of a computing device. For example, and not limitation, each such unit can be, in whole or in part, a hardware or software module. The various units of the communication system 100 can be in coordination with one another for operation of the communication system 100. Although the units are described separately throughout this disclosure, it will be understood that the distinction between units need not be a hardware distinction. In various exemplary embodiments, the various units can share the same or overlapping hardware and software.

The image capture device 170 can capture an image of one or more visual markers 50, such as barcodes or fiducials. The image capture device can be a still camera, video camera or other device for detecting visible information about the environment. In some embodiments of the invention, the image capture device 170 can be integrated into the assistive device 110. In other embodiments, however, the image capture device 170 can be distinct from the assistive device 110 but in communication with it, such as over a wireless connection. If separate from the assistive device 110, the image capture device can be worn by a user around the user's neck, attached to the user's clothing, or attached to headgear of the user. The user can either actively scan the environment for particular visual markers 50 with the image capture device 170, or the image capture device 170 can simply capture an image of whatever is in its range.

The image receipt unit 120 can communicate the image from the image capture device 170 to the image processing unit 130. In some embodiments, the image receipt unit 120 can be the image capture device 170 itself, such as when the image capture device 170 is part of the assistive device 110. Alternatively, however, the image capture device 170 can be distinct from the assistive device 110, and the image receipt unit 120 can receive the image from the image capture device 170. For example, the image receipt unit 120 can be a wireless card in communication with the image capture device 170.

The image processing unit 130 can analyze the image. For example, the image processing unit 130 can use computer vision software. In analyzing the image, the image processing unit 130 can extract a set of one or more visual markers 50 appearing in the image. The set of visual markers 50 in the image can then be transmitted to the context processing unit 140 for further analysis.

Each visual marker 50, or predetermined grouping of visual markers 50, can be associated with a target. In an exemplary embodiment, a target of a visual marker 50 can be a person, object, or location, and each visual marker 50 can be placed so that it identified its target. For example, a visual marker 50 can be printed on an identification tag attached to a person; a visual marker 50 can be positioned on a structure, such as a building or an internal wall of a room; or a visual marker 50 can be attached to an object.

A visual marker 50 can present data to the communication system 100. For example, if a visual marker 50 is a barcode, such as a linear barcode or a two-dimensional QR code, the visual marker 50 can include a data payload encoded on the visual marker 50 itself. Thus, by reading the visual marker 50, the communication system 100 can extract the data that it represents. If the visual marker 50 is a fiducial, the communication system 100 can use the visual marker 50 to determine a position and orientation of the image capture device 170 with respect to the visual marker 50. If the size, orientation, and position of the visual marker 50 are fixed in space and known to the communication system 100, the system 100 can calculate the position of the image capture device in the environment. Additionally, any information encoded on the fiducial can be extracted, provided as input to the communication system 100, and, if necessary, mapped to corresponding data accessible by the communication system 100. Thus, information encoded in a visual marker 50 can serve as an identifier or can provide input of an arbitrary data payload to the system.

The context processing unit 140 can determine one or more environmental contexts corresponding to the visual markers 50. Each environmental context can be a virtual representation of the current environment of the image capture device 170 and, presumably, the current environment of the user of the communication system 100. In an exemplary embodiment, an environmental context can comprise all or a subset of the entire set of targets or visual markers 50 found in the image. The context processing unit 140 can have access to data related to predetermined environmental contexts. Accordingly, the context processing unit 140 can identify available environmental contexts included among the set of targets or visual markers 50 in the image.

An environmental context can be a virtual representation of the environment surrounding the communication system 100. For example, if the image includes a first visual marker 50 identifying the wall of a cafeteria and further includes a second visual marker 50 identifying a particular person, then the context processing unit 140 can identify an environmental context corresponding to being in the cafeteria with that particular person. For another example, if the image includes a visual marker 50 identifying a particular museum exhibit or tourist attraction, then the context processing unit 140 can identify an environmental context corresponding to being in the vicinity of, and facing, that museum exhibit or attraction. For yet another example, if the image includes a visual marker 50 identifying an object, then the context processing unit 140 can identify an environmental context corresponding to the vicinity of the object. The communication system 100 can present potential communication outputs to the user based on the available environmental contexts identified in the image.

If more than a single environmental context is available based on the visual markers 50 detected, communication system 100 can either select a current environmental context from among those available, or the communication system 100 can present the available environmental contexts to the user for manual selection. In the case of manual selection, the assistive device 110 can present to the user representations of the available environmental contexts. Such representations can be provided to the user in audio, text, images, or a combination of output media. After providing the available environmental contexts to the user, the assistive device 110 can receive from the user a selection of one of the available environmental contexts. If the display screen 160 is a touchscreen, then the selection can be received when the user touches the screen to indicate the desired environmental context. Alternatively, the selection can be received via a microphone, typing, or other means. The selected environmental context can become the current environmental context, on which potential outputs are based.

The application layer 150 can map the current environmental context to a set of potential outputs, which can be potential communication outputs. In an exemplary embodiment, the outputs are customized to the environmental context. For example, and not limitation, the outputs can include the name of a person identified by a visual marker 50 included in the environmental context. Thus, if the potential outputs include greeting phrases or questions, these phrases or questions can be customized to address the person by name. For another example, if the environmental context is related to a location, the potential outputs can provide information about the location. In the case of an exhibit or tourist attraction, the potential outputs can be narratives describing the exhibit or attraction. For yet another example, if the environmental context is related to an object, the potential outputs can provide information about the object or instructions for handling the object. In some embodiments of the invention, artificial intelligence can be used to dynamically generate phrases for the set of potential outputs. For example, the application layer 150 can combine units of language, such as syllables, words, and target names, into cogent phrases based on the environmental context.

The potential communication outputs can be presented to the user. In an exemplary embodiment, the potential outputs are potential audio outputs, and they are presented to the user as text or images on the display screen 160. The user can select a potential output, such as by touching the display screen 160 to indicate his selection. The communication system 100 can then provide the selected output to an output device, which can be the display screen 160 or an audio output device 180, such as a speaker. When an audio output device 180 is used, the selected output can be audibly output to communicate with the user or with another person in the vicinity. Communications output to the user can provide cognitive aid to the user, while communications output to others can facilitate interpersonal communications between the user and others.

In an exemplary embodiment, the communication system 100 can automatically and dynamically update based on the environment and based on the user's selections. For example, each time a new image is received, the new image can be analyzed by the communication system 100, which can dynamically update its display 160 to present the user with updated environmental context choices. When the user selects an available environmental context, the display screen 160 can dynamically update to present the output options corresponding to the selected environmental context. Thus, the communication system 100 can provide a user-friendly, dynamic interface.

Figure 2:
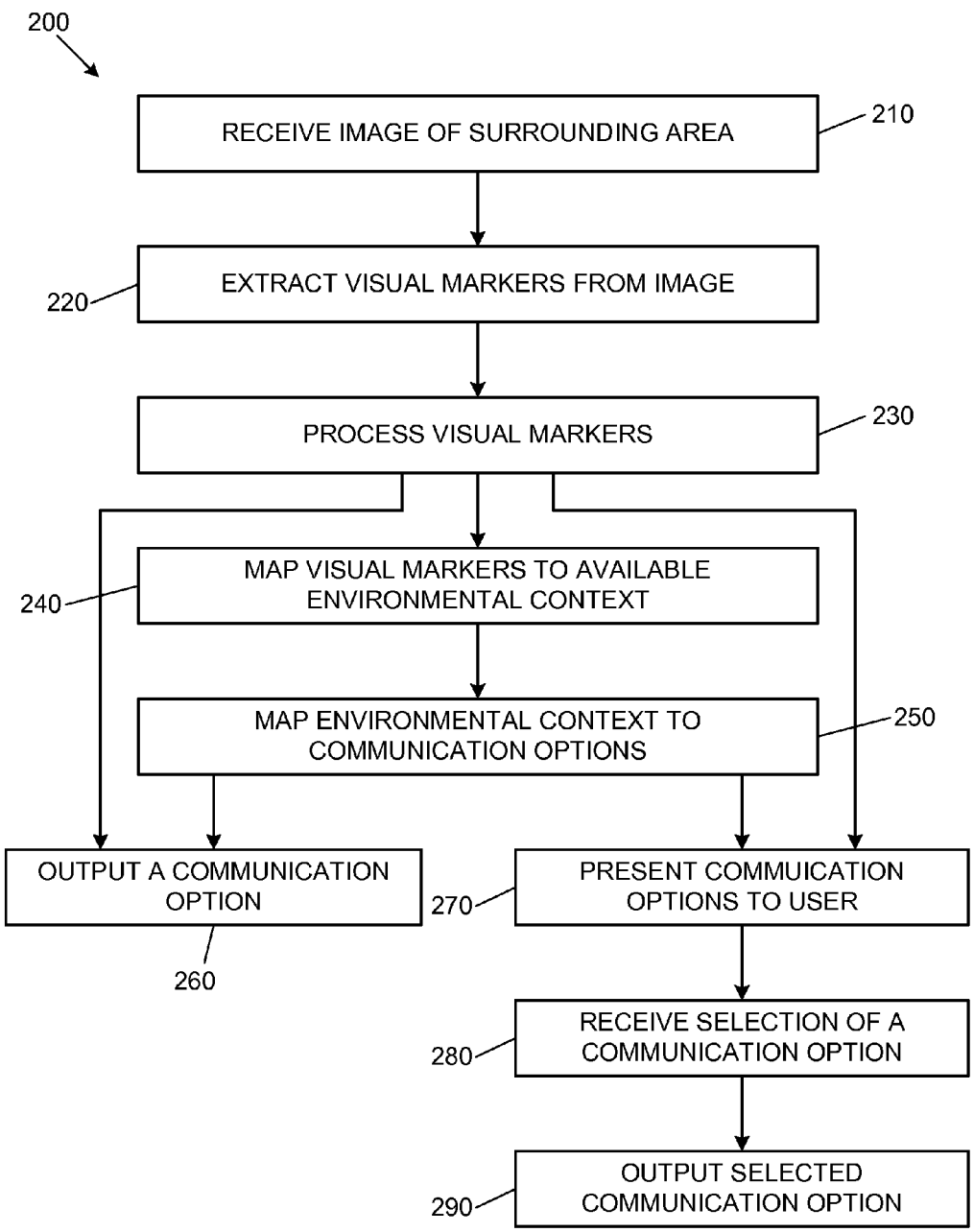
FIG. 2 illustrates a flow diagram of a communication method, according to an exemplary embodiment of the present invention.

FIG. 2 illustrates a flow diagram of a communication method 200, according to an exemplary embodiment of the present invention. It will be understood that the illustrated method is provided for illustrative purposes only and does not limit the various embodiments of the invention. Other methods may also be used. As shown in FIG. 2, at 210, an image of the surrounding environment is received. At 220, the image is analyzed to extract a set of visual markers 50. At 230, the visual markers 50 are processed. If a visual marker 50 includes a data payload, the data payload can be extracted from the visual marker 50. If a visual marker 50 is a fidicial, the communication system 100 can determine a position and orientation of the visual marker 50 with respect to the image capture device 170. At 240, the processed visual markers 50 are mapped to at least one environmental context. In some embodiments, if more than a single environmental context is deemed available, the environmental contexts can be presented to the user for manual selection.

Embodiments of the invention can be used for receptive or expressive communication. For receptive communication, the communication system 100 can output a particular, single communication automatically selected based on the environmental context. In that case, at 260, a communication is output after an environmental context is identified, without manual selection, which communication can include data (e.g., names of targets) extracted from the visual markers 50. Alternatively, the communication can be expressive, enabling the user to choose between various communication options. In that case, at 270, one or more communication options, which can include data extracted from the visual markers 50, are presented to the user based on the environmental context in use. At 280, a selection of at least one of the communication options is received. At 290, the selected communication option is output, such as via a speaker 180.

Figure 3:
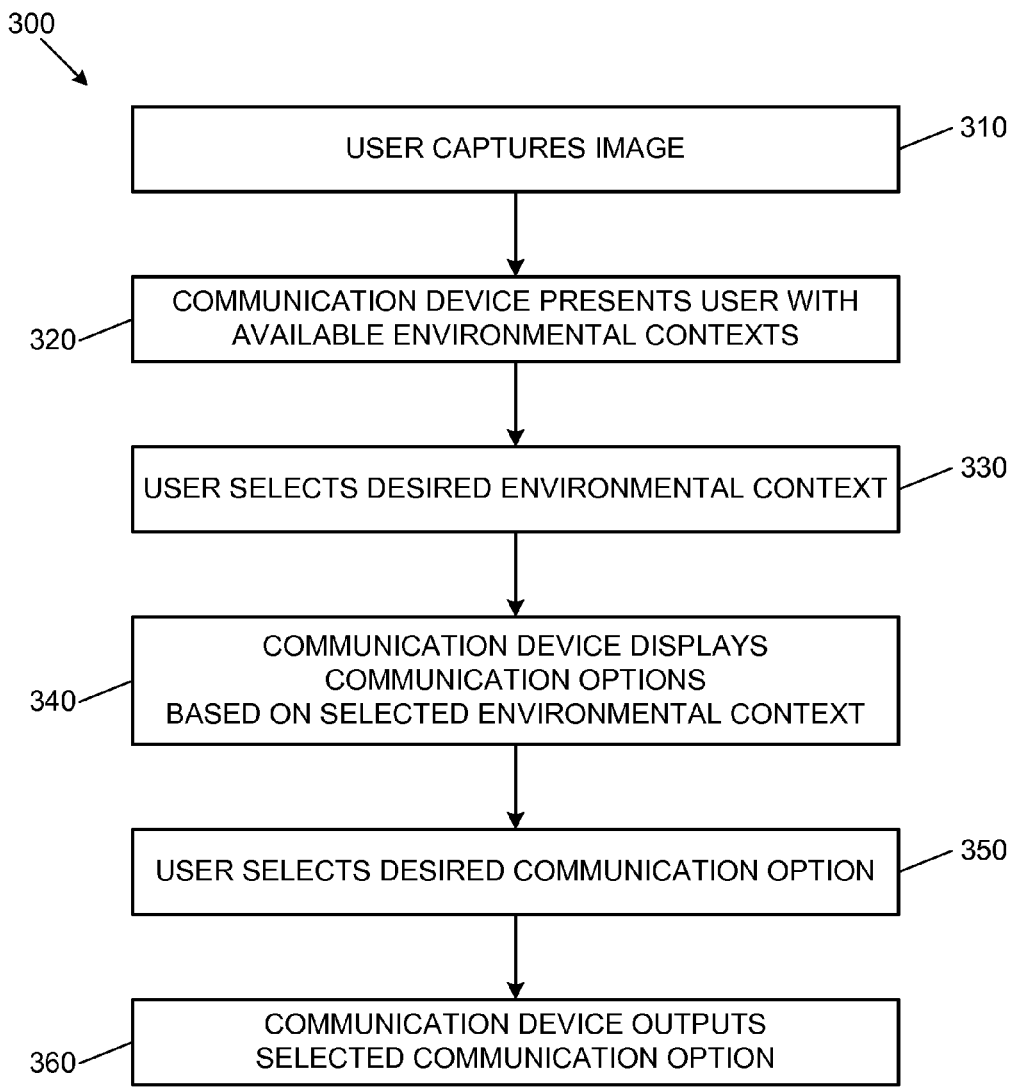
FIG. 3 illustrates a flow diagram of a method of using an assistive device of the communication system, according to an exemplary embodiment of the present invention.

FIG. 3 illustrates a flow diagram of an exemplary method 300 of using an assistive device of the communication system, according to an exemplary embodiment of the present invention. It will be understood that this particular use case is illustrative only and does not limit the scope of the invention. The communication system 100 and assistive device 110 can have various uses. As shown, at 310, a user can capture an image of the environment with the image capture device 170. To initiate capture of the image, the user may actively position the image capture device 170, or the image capture device 170 can be positioned on, or held by, the user, and it can automatically capture an image of whatever happens to be in its field of view. At 320, after extracting and analyzing the visual markers 50 in the image, the assistive device 110 can present the user with one or more environmental contexts from which to choose. At 330, the user can select an environmental context. At 340, the assistive device can display a plurality of communication options, such as audio output options, that are based on the selected environmental context. At 350, the user can select one of the displayed communication options. At 360, the assistive device can output the selected option audibly through its speakers 180.

FIG. 4 illustrates an architecture of an exemplary computing device 400 in which all or a portion of the communication system 100 can be embodied, according to an exemplary embodiment of the present invention. In some embodiments, the hardware of the assistive device 110 can be the same as, or similar to, the hardware illustrated in FIG. 4. Those skilled in the art will recognize that the general architecture described with reference to FIG. 4 is for example only, and can be modified to accommodate various embodiments of the communication system 100.

As shown in FIG. 4, the assistive device 110 can comprise a central processing unit 405 ("CPU") and one or more system memories 407, such as a random access memory 409 ("RAM") and a non-volatile memory, such as a read-only memory ("ROM") 411. The assistive device 110 can further comprise a system bus 412 coupling together the memory 407, the CPU 5, and various other components. A basic input/ output system containing routines to assist in transferring information between components of the assistive device 110 can be stored in the ROM 411. Additionally, the assistive device 110 can include a storage device 414 for storing an operating system 416 and data related to operation of the communication system 100.

The storage device 414 can be connected to the CPU 405 through a storage controller (not shown) connected to the bus 412. The storage device 414 and its associated computer-readable media can provide non-volatile storage for the assistive device 110. The computer-readable media can comprise computer storage media and communication media. Computer storage media can include volatile and non-volatile, removable and non-removable media implemented in various methods or technologies for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or any other media that can be used to store the desired data and can be accessible by the assistive device 110. Computer-readable instructions on the storage media of the assistive device 110 can include, for example, instructions for implementing processes of the communication system 100.

According to various embodiments of the invention, the assistive device 110 can operate in a networked environment using logical connections to remote computers, such as a remote server. The assistive device 110 can connect over a network 418 through a network interface unit 420 connected to the bus 412.

The assistive device 110 can also include an input/output controller 422 for receiving and processing input from a number of devices, including the display screen 160 and the image capture device 170. The input/output controller 422 can provide output to the display screen 160 and the audio output device 180.

While the communication system has been disclosed in exemplary forms, it will be apparent to those skilled in the art that many modifications, additions, and deletions may be made without departing from the spirit and scope of the system, method, device, and their equivalents, as set forth in the following claims.

What is claimed is:

1. A communication system comprising:
    an image receipt unit for receiving an image, the image comprising a set of one or more visual markers;
    an image processing unit for analyzing the image, by a computer processor, and identifying the set of visual markers, each visual marker corresponding to a target;
    a context processor for processing the visual markers to identify the targets corresponding to the visual markers;
    an application layer for generating two or more communication options customized based on the targets corresponding to the set of visual markers;
    the application layer further for outputting the two or more communication options for presentation to a first person; and
    a selection unit for receiving a user selection, from the first person, of a chosen communication option from the two or more communication options.

2. The communication system of claim 1, wherein generating the two or more communication options comprises combining a plurality of language units into two or more communication phrases that are customized based on the targets corresponding to the set of visual markers.

3. The communication system of claim 1, further comprising an audio output device for outputting audio communications for hearing by a second person, the audio corresponding to the chosen communication option of the user selection, wherein the first person and second person are different persons.

4. The communication system of claim 1, at least two of the two or more communication options each comprising a distinct phrase for communication to a second person based on the set of visual markers.

5. The communication system of claim 4, the distinct phrases for communication to a second person being in a same language.

6. The communication system of claim 1, the set of visual markers comprising a barcode or a fiducial.

7. The communication system of claim 1, the image processing unit being further configured to identify a second person, object, or location based on the set of visual markers.

8. The communication system of claim 7, the image processing unit being further configured to identify a second person based on the set of visual markers, and the two or more communication options comprising a phrase for communicating with the second person.

9. The communication system of claim 8, the distinct phrases including a name of the identified second person.

10. The communication system of claim 1, the image receipt unit being an image capture device for capturing an image of a surrounding area.

11. The communication system of claim 10, the image processing unit being further configured to determine a position of the set of visual markers relative to the image capture device.

12. The communication system of claim 10, the image processing unit being further configured to determine an orientation of the set of visual markers with respect to the image capture device.

13. The communication system of claim 1, being integratable into a mobile telephonic device.

14. An assistive communication device comprising:
    an image receipt unit for receiving one or more images of a surrounding area;
    a computer processor for extracting one or more labels from the one or more images;
    a context processor for identifying a first environmental context based on the one or more labels;
    an application layer for mapping the first environmental context to a first set of two or more potential audio outputs, and for receiving a user selection, from a first user, of a potential audio output from among the first set of potential audio outputs; and
    an audio output device for audibly outputting the selected potential audio output for hearing by a second user.

15. The assistive communication device of claim 14, the set of potential audio outputs comprising one or more greetings for output to the second user.

16. The assistive communication device of claim 15, the communication phrases being customized based on the first environmental context.

17. The assistive communication device of claim 14, the context processor being further configured to identify a second environmental context based on the one or more labels, and the context processor being further configured to map the second environmental context to a second set of potential outputs.

18. A communication method comprising:
receiving an image;
analyzing the image by a computer processor to identify a set of one or more visual markers in the image;
mapping the set of visual markers to a target, wherein the target is a second person, object, or location;
generating two or more potential human sensible outputs related to the set of targets, at least one of the two or more potential human sensible outputs including information about the target; and
receiving a user selection corresponding to one of the two or more human sensible outputs, the user selection made by a first person.

19. The communication method of claim 18, the potential human sensible outputs being directed to a third person.

20. The communication method of claim 18, further comprising outputting a selected one of the potential human sensible outputs via an audio output device.

\* \* \* \* \*